J. H. HOPKINS.
CHURN.
APPLICATION FILED DEC. 7, 1909.

970,823.

Patented Sept. 20, 1910.
3 SHEETS—SHEET 3.

Witnesses:
Samuel Payne
K. H. Butler

Inventor
J. H. Hopkins.
by
Attorneys.

THE NORRIS PETERS CO., WASHINGTON, D. C.

UNITED STATES PATENT OFFICE.

JOHN H. HOPKINS, OF PUNXSUTAWNEY, PENNSYLVANIA.

CHURN.

970,823.

Specification of Letters Patent.   Patented Sept. 20, 1910.

Application filed December 7, 1909.   Serial No. 531,858.

*To all whom it may concern:*

Be it known that I, JOHN H. HOPKINS, a citizen of the United States of America, residing at Punxsutawney, in the county of Jefferson and State of Pennsylvania, have invented certain new and useful Improvements in Churns, of which the following is a specification, reference being had therein to the accompanying drawing.

This invention relates to churns of the revolving dasher class and the object thereof is to provide a churn in a manner as hereinafter set forth with the dasher shaft driven by a belt transmission and with the operating mechanism for the belt provided with means for shifting the dasher shaft to keep the belt taut when the churn is operated.

Further objects of the invention are to provide a churn of the revolving dasher class which shall be comparatively simple in its construction and arrangement, strong, durable, efficient in its use, conveniently operated, and comparatively inexpensive to manufacture.

With the foregoing and other objects in view, the invention consists of the novel construction, combination and arrangements of parts as hereinafter more specifically described and illustrated in the accompanying drawings, wherein is shown the preferred embodiment of the invention, but it is to be understood that changes, variations and modifications can be resorted to which come within the scope of the claims hereunto appended.

Figure 1:
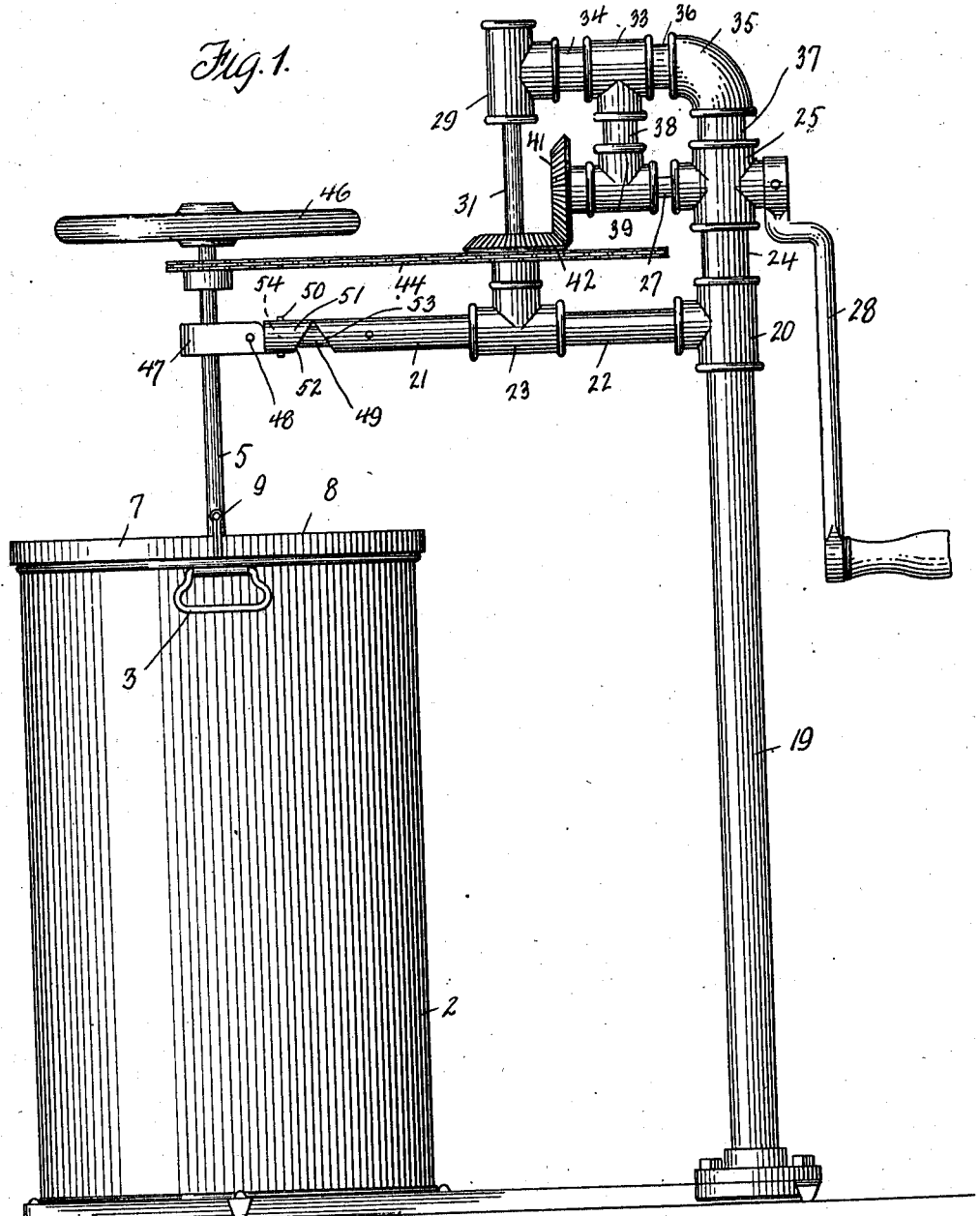
Figure 2:
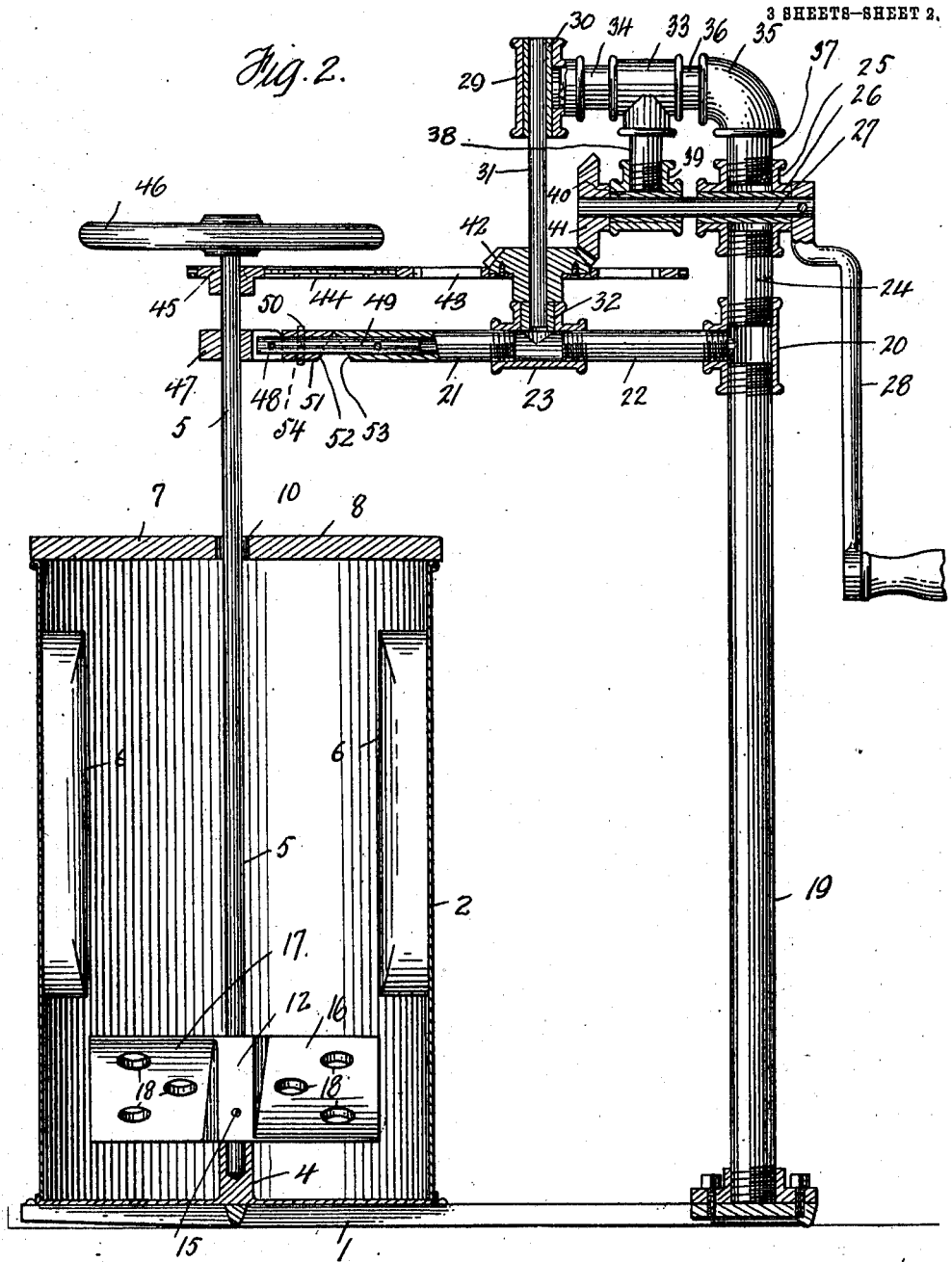
Figure 3:
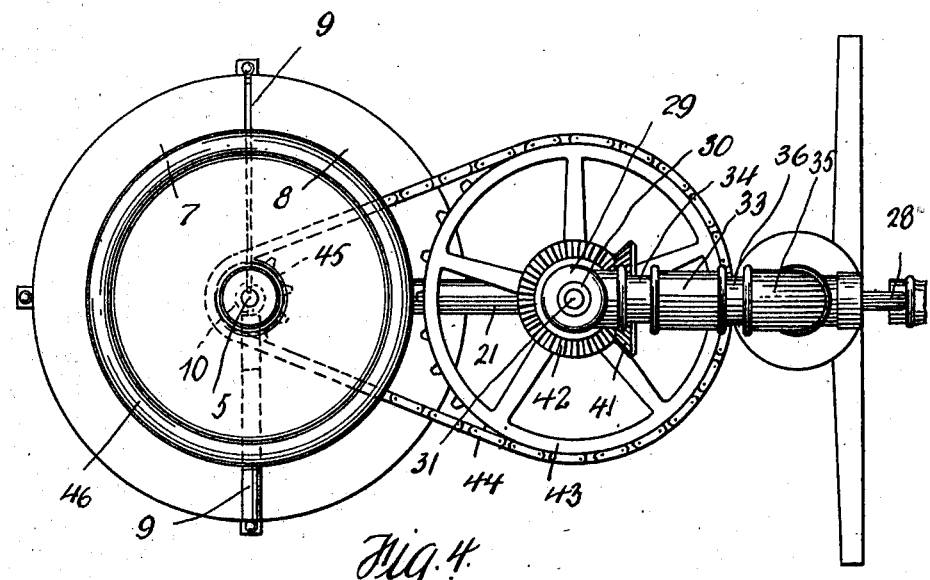
Figure 4:
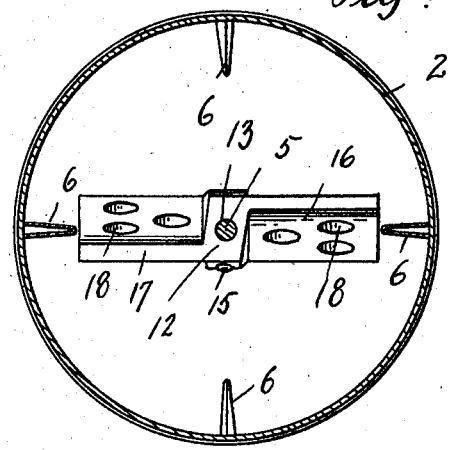
Figure 5:
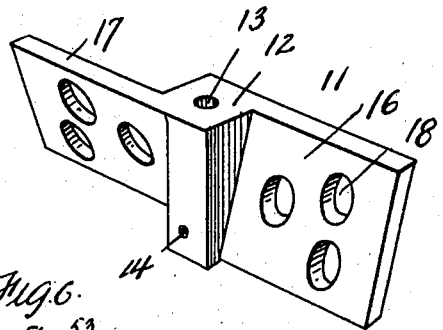
Figure 6:
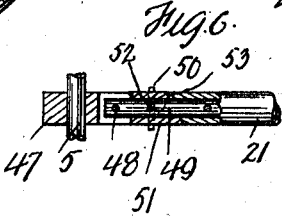

In the drawings wherein like reference characters denote corresponding parts throughout the several views:—Figure 1 is a side elevation of a churn in accordance with this invention. Fig. 2 is a sectional elevation of the churn. Fig. 3 is a top plan view of the churn. Fig. 4 is a sectional plan illustrating the churn body and the dasher. Fig. 5 is a perspective view of the dasher, and Fig. 6 is a sectional detail illustrating the tensioning means for the transmission belt.

Referring to the drawings in detail:—1 denotes a base upon which is detachably secured the churn body 2 which is in the form of a cylindrical receptacle and at its top is provided with handles 3 so that the receptacle 2 can be conveniently moved when occasion so requires. The bottom of the receptacle 2 is provided approximately centrally thereof with an upwardly extending bearing socket 4 for the lower end of the revoluble dasher shaft 5 and the inner face of the receptacle 2 has secured thereto a series of inwardly extending deflectors 6 which are equally spaced throughout the interior thereof. The deflectors 6 are disposed vertically and extend from a point removed from the top of the receptacle to a point above the bearing socket 4. The receptacle 2 during the operation of churning is closed by removable sectional cover, the sections being indicated by the reference characters 7 and 8 and hinged together, as at 9. The cover centrally thereof is provided with an opening 10 for the passage of the dasher shaft 5.

The dasher, which is indicated by the reference character 11 and best shown in Fig. 5, consists of a body portion 12 having a vertically disposed opening 13 through which extends the dasher shaft 5 and the body portion 12 is furthermore provided with a transversely extending opening 14 in which is mounted a holdfast device 15, such as a set screw, for connecting the dasher 11 to the shaft 5 so that when the latter is operated the dasher will be carried therewith. The dasher 11 further comprises a pair of inclined dasher arms 16 and 17 which project laterally from the body portion 12 and each of which is formed with a series of circular openings 18. The dasher arms 16 are inclined with respect to the perpendicular, but the inclination of the arms 16 is opposite with respect to the arms 17. When the dasher 11 is mounted in position upon the shaft 5 it is situated within the receptacle in proximity to the bearing socket 4 and below the lower ends of the deflectors 6, the latter associating with the dasher to facilitate the churning operation.

Mounted upon the base 1 at one side of the receptacle 2 and also secured to the base is a vertically disposed upright 19 which has coupled thereto through the medium of the T 20 a right-angularly disposed supporting member formed of two sections 21 and 22 coupled together by the T 23. Secured to the T 20 is a vertically disposed member 24 having attached thereto a four-way coupling 25 which supports a bearing 26 for an actuating shaft 27 provided at its outer end with a handle 28.

The reference character 29 denotes a T coupling provided with a bushing 30 through which extends a vertically disposed driven shaft 31 journaled at its lower end in a bearing 32 carried by the T coupling 23. The T 29 is connected with the T 33 by an arm 34 and the T coupling 33 is connected with an elbow 35 by a short arm 36 and the elbow 35 is connected to the T coupling 25 by a short arm 37. The arms 34 and 36 and T coupling 33 are disposed at right-angles to the upright 19. Connected to the T coupling 33 by the vertically disposed arm 38 is a T coupling 39 provided with a bushing 40 through which extends the shaft 27, the inner end of the latter has fixed thereto a bevel gear 41 which meshes with the bevel gear 42 fixed at the lower portion of the shaft 31. The shaft 31 below the bevel gear 42 has fixed thereto a sprocket wheel 43 which communicates with the sprocket chain 44 the latter engaging with a sprocket pinion 45 fixed upon the upper end of the dasher shaft 5. The shaft 5 projects above the sprocket pinion 45 and upon the projecting end is mounted a balance wheel 46.

It is evident from the foregoing construction of parts that when the actuating shaft 27 is revolved through the medium of the handle 28 that motion will be transmitted to the bevel gear 42 owing to the fact that the gear 41 meshes with the gear 42 and will revolve the gear 42 when the shaft 27 is rotated. The revolving of the gear 42 will rotate the shaft 31 which in turn will revolve the sprocket 43 and through the medium of the transmission belt 44 engaging with the sprocket pinion 45 the dasher shaft 5 will revolve carrying the dasher 11 therewith.

To maintain the transmission 44 taut and to also support the upper end of the dasher shaft 5 a combined supporting and tensioning means is provided and which consists of a yoke 47 surrounding the dasher shaft 5 and connected by the pin 48 to an arm 49 loosely extending in the outer end of the member 21. Detachably connected by the set screw 50 to the arm 49 is a sleeve 51, having one end thereof beveled, as at 52, whereby the sleeve 51 constitutes what may be termed a cam sleeve. The beveled end 52 of the sleeve 51 associates with the free end of the member 21, said free end being beveled, as at 53, and constitutes a cam face against which rides the beveled end 52 of the sleeve 51 so that when the sleeve 52 is rotated in one direction the arm 49 will be shifted outwardly from the section 21 whereby any slack in the transmission belt will be taken up as is obvious. The arm 49 is provided with a series of openings 54 which receive the inner end of the set screw 50 so that the sleeve 51 can be retained in its adjusted position by the set screw 50.

What I claim is:—

1. In combination, a base, a churn body mounted thereon, an upright fixed to the base at one side of said body, a dasher shaft journaled in the churn body and provided with a dasher, a right-angularly-disposed supporting member connected to said upright, a horizontally-disposed drive shaft supported by said upright, a vertically-disposed driven shaft supported by said member and upright, a beveled gear carried by the drive shaft, a beveled gear connected to the driven shaft and meshing with the gear carried by the drive shaft, a sprocket wheel fixed to the hub of the gear upon the driven shaft, a sprocket pinion fixed to the dasher shaft, an operative connection between said sprocket pinion and sprocket wheel for operating the dasher shaft when the driven shaft is operated, a handle connected to the drive shaft for operating it, and a tensioning device for said operative connection, said tensioning device connected at one end with said dasher shaft and at its other end with said supporting member.

2. In combination, a base, a churn body mounted thereon, an upright fixed to the base at one side of said body, a dasher shaft journaled in the churn body and provided with a dasher, a right-angularly-disposed supporting member connected to said upright, a horizontally-disposed drive shaft supported by said upright, a vertically-disposed driven shaft supported by said member and upright, a beveled gear carried by the drive shaft, a beveled gear connected to the driven shaft and meshing with the gear carried by the drive shaft, a sprocket wheel fixed to the hub of the gear upon the driven shaft, a sprocket pinion fixed to the dasher shaft, an operative connection between said sprocket pinion and sprocket wheel for operating the dasher shaft when the driven shaft is operated, a handle connected to the drive shaft for operating it, a tensioning device for said operative connection, said tensioning device connected at one end with said dasher shaft and at its other end with said supporting member, and vertically-disposed deflectors secured to the inner face of said churn body and arranged above the plane of the dasher.

3. In combination, a base, a churn body mounted thereon, an upright fixed to the base at one side of said body, a dasher shaft journaled in the churn body and provided with a dasher, a right-angularly-disposed supporting member connected to said upright, a horizontally-disposed drive shaft supported by said upright, a vertically-disposed driven shaft supported by said member and upright, a beveled gear carried by the drive shaft, a beveled gear connected to the driven shaft and meshing with the gear carried by the drive shaft, a sprocket wheel fixed to the hub of the gear upon the driven shaft, a sprocket pinion fixed to the dasher shaft, an operative connection between said sprocket pinion and sprocket wheel for operating the dasher shaft when the driven shaft is operated, a handle connected to the drive shaft for operating it, a tensioning device connected at one end with said dasher shaft and at its other end with said supporting member, vertically-disposed deflectors secured to the inner face of said churn body and arranged above the plane of the dasher, and a hand wheel mounted upon the outer end of the dasher shaft.

In testimony whereof I affix my signature in the presence of two witnesses.

JOHN H. HOPKINS.

Witnesses:
JOHN L. THOMAS,
H. M. MEANS.